Figure 1:
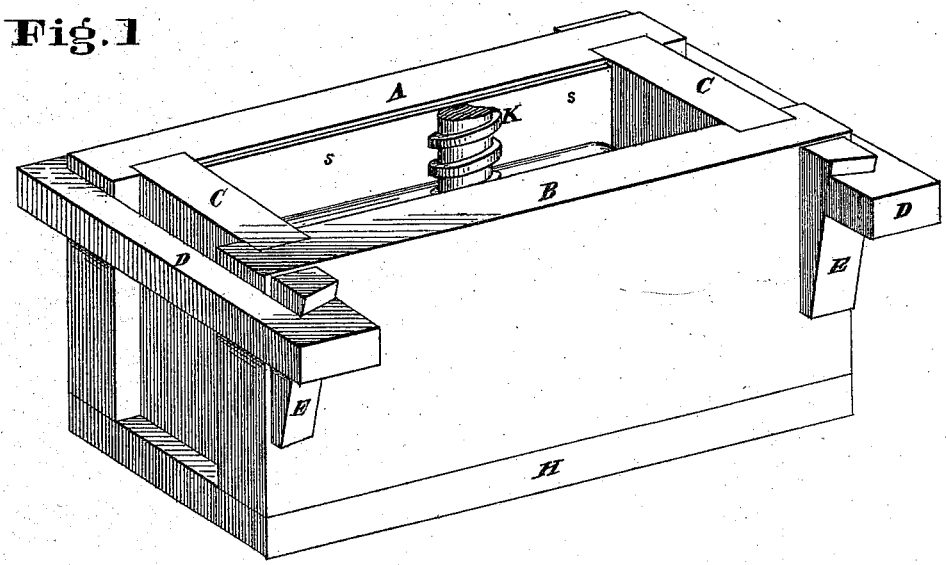

J. A. McCLELLAND.
Collodion Compounds.

No. 143,772.  Patented Oct. 21, 1873.

Attest:
C. G. Hale
John E. Hutch

Inventor
John A. McClelland
per Fisher and Duncan,
his attorneys

UNITED STATES PATENT OFFICE.

JOHN A. McCLELLAND, OF LOUISVILLE, KENTUCKY.

IMPROVEMENT IN COLLODION COMPOUNDS.

Specification forming part of Letters Patent No. 143,772, dated October 21, 1873; application filed June 12, 1873.

*To all whom it may concern:*

Be it known that I, JOHN A. MCCLELLAND, of Louisville, Kentucky, have invented certain Improvements in the Process of Solidifying Collodion, or the converted preparations of xyloidine, pyroxyline, and their compounds, of which the following is a specification:

The first part of my invention consists in the application of pressure more or less constant to converted preparations of xyloidine, pyroxyline, or soluble fiber and their compounds, when prepared with and converted by solvents for the purpose of expressing the solvents therefrom. The second part of my invention consists in the application of pressure to the converted preparations mentioned in the description of the first part of my invention, and alternating this pressure with an exposure of the said converted preparation to the open air to admit of the escape of the solvents. The third part of my invention relates to combining, with the application of pressure, as aforesaid, absorbent materials, placed in such conjunction with the said converted preparation as to absorb the solvents of the preparation as rapidly as they are expressed, and also relates to a device for preventing the absorbent materials from adhering to the converted preparation.

By means of my improved methods solid slabs or blocks of collodion, or converted pyroxyline, xyloidine, and their compounds, of any desired thickness or lateral dimensions, can be prepared, free throughout from porosity, and at the same time accomplished cheaply and rapidly.

If the pyroxyline, &c., is to be combined with resins, gums, balsams, oils, coloring matters, or other substances, this is first to be done by any appropriate process which will reduce the compound to a homogeneous plastic molding mass. I prefer to employ for this purpose the process set forth in my said Letters Patent for improved machine for treating collodion and its compounds, No. 90,766, dated June 1, 1869.

This process consists in introducing the pyroxyline, and the substances, if any, to be compounded with it, together with appropriate solvents, into a cylinder connected by small holes or apertures to a second cylinder, through which the substance referred to is forced back and forth from one cylinder to the other by means of an air-tight piston working in each cylinder, the piston of one cylinder being made to rise, while that in the other descends, a vacuum having been first created under the cylinders. As this operation is continued the substances are thoroughly comminuted and mixed into a homogeneous mass. This, however, is only one of numerous devices which may be employed to properly prepare the preparation before drying it.

One property peculiar to collodion or converted pyroxyline, xyloidine, and their compounds, is their tendency to become porous or spongy on giving up their solvents by evaporation. When, after being dried, thus spongy or porous, it is comparatively worthless.

When the bulk of the converted preparation is light—that is to say, does not exceed one-eighth of an inch in thickness—it may be exposed to the air at a temperature considerably below the boiling-point of sulphuric ether, and the evaporation of its solvents allowed to go on. Under such conditions a quite solid layer of the preparation may be obtained without any auxiliary means; but when the bulk of this preparation is thicker than one-eighth of an inch it is impossible to so solidify it as to obtain a good article free from porosity, unless auxiliary means be employed during the process of solidifying it.

My present invention, which I now proceed to describe, enables me to solidify the said preparation in blocks or slabs of any required thickness and free from porosity.

Having mixed and worked the preparation until of the consistency of a stiff paste, I place the same in a mold of suitable form. The mold I prefer consists of a box of metal or wood. The sides of the mold are upright and parallel to each other, and the ends are upright and parallel to each other, and at right angles with the sides. The mold is of a height sufficient to fully inclose the preparation to be dried, the absorbent materials, two flat strips of iron or other stiff material, and at the same time afford sufficient space at the top for the insertion of a piston or plunger. One of the sides of the mold is preferably made adjustable, so that it can be removed from the mold to facilitate the introduction into the mold of the preparation to be solidified.

Figure 2:
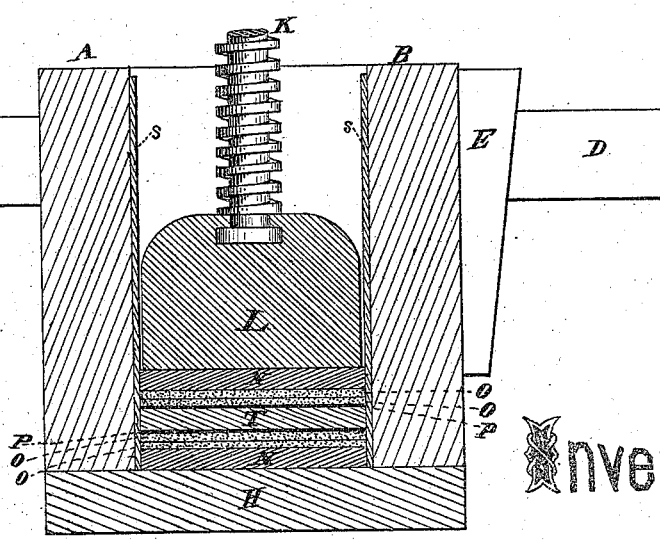

In the accompanying drawing, Figure 1 is a view in perspective of the top, side, and end of the mold I employ, exhibiting also a device for rendering one side of the mold adjustable. Fig. 2 is a transverse vertical section, taken near the screw K.

A and B are the sides, C C the ends, and H the bottom, of the mold. The side B is removable from the remaining portions of the mold. D D are clamps, which, by the aid of wedges E E, hold B securely in its place against the edges of the ends C C. The side B can be removed by withdrawing the wedges from the clamps, and can be readjusted by replacing the wedges and tightening them in their respective clamps, as shown in Fig. 1 of the accompanying drawing. A loose plate, S, of zinc or other stiff material lines each wall of the mold. For completing the furniture of the mold I prepare strip N of iron or other stiff material, and pads O of some good absorbent material, as woolen cloth or sheets of blotting-paper. The strips and the pads are of such a size longitudinally and transversely as to accurately fit the orifice of the mold. I also prepare a weight or piston, L, accurately fitting the orifice of the mold, and if a piston is used, I combine with it any of the well-known mechanical devices, whereby I can, at will, cause it to transmit any desired amount of pressure to the preparation in the mold.

The dimensions of the mold and of its furniture, and of the piston or weight, are to be varied according to the desired size of the blocks into which the preparation is made.

The preparation of pyroxyline, &c., being converted and ready to be dried, I loosen the wedges E and remove the side B. I then place on the bottom of the mold one of the strips N, and upon the latter one or more pads, O, are laid. A sufficient quantity of this preparation, T, to make, when dried, a block of the desired dimensions, is now taken, and upon its top and bottom I place a piece of thin paper, P, (that which is unsized is preferable, as it makes a better absorbent, or if paper cannot be had then some thin equivalent absorbent.) The preparation thus coated is introduced within the mold and laid upon the upper pad O. Upon the upper surface of the preparation are then laid one or more woolen pads, and upon the latter, in turn, is laid a strip, N. The side B is now adjusted tightly in its place against the ends D D, by means of the wedges and clamps aforesaid, and the mold made continuous throughout.

The preparation is now ready to be pressed. The piston L is now introduced within the mold from above, and, by suitable devices, pressed down upon the felt-cloth or absorbent pad, thereby transmitting pressure to the soft preparation. By this pressure the solvent or solvents are forced out of the preparation, and are taken up by the absorbing-pads.

By this means the compound will be thoroughly and quickly dried, and will be entirely solid, and wholly free from any kind of porosity. If desired to hasten the process of drying, a gentle heat is to be applied by means of an oven, &c., to the preparation while under pressure, beginning at a temperature of 100° or 110° Fahrenheit, and gradually raising the temperature, as the solvents depart, to 180°.

On opening the mold, after the material has been in even a short time, the felt-cloth will be found damp with the solvent it has absorbed during the pressure. A frequent changing of the pads during the drying process greatly facilitates the absorbing process.

After the process of solidifying the preparation has proceeded so far that the preparation will retain its solidity without pressure, the solidifying may be further conducted without pressure.

I do not limit myself to a process of solidifying such preparation, which necessarily includes the use of pads or paper. Subjecting the preparation to pressure between solid bodies, and alternating the pressure with exposure to the open air to admit of the solvents passing out of the preparation, will, with care and proper attention, produce a comparatively solid material.

The paper adhering to the preparation performs a double office: First, it allows the solvents to pass through it to the pads or open air; and, secondly, it prevents the fibers of the pads, &c., from adhering to the preparation. The paper can be easily and quickly removed from the preparation by wetting it and then rubbing it off.

Care must be taken that the subjection of the preparation to the pressure be not deferred too long during the early stage of solidification, because, when such is the case, openings, pits, or cells, will form in the body of the material, resembling those exhibited in light bread. Once formed, though they be collapsed or closed by pressure, they do not unite perfectly, and such defects show badly when the material comes to be worked up into the various articles it was designed for.

What I claim is—

1. The process of drying said converted preparations by the alternate application of pressure and exposure to the atmosphere, to admit of the escape of the solvents.

2. Pads of felt-cloth or other absorbent material, employed to absorb the solvents of said converted preparations while the latter are under pressure.

3. Pads of felt-cloth or other absorbent material, employed to absorb the solvents of said converted preparations while the latter are under pressure in a close vessel.

4. Paper or other equivalent material, employed to protect said converted preparations from contact with the pads or walls of the mold, substantially as and for the purpose specified.

JOHN A. McCLELLAND.

Witnesses:
H. C. ANDERSON,
W. D. SKENE.